(12) United States Patent
Huang et al.

(10) Patent No.: US 8,749,613 B2
(45) Date of Patent: Jun. 10, 2014

(54) WIDE-ANGLE ZOOM LENS AND CAMERA MODULE USING SAME

(75) Inventors: Hai-Jo Huang, Tu-Cheng (TW);
Fang-Ying Peng, Tu-Cheng (TW);
Sheng-An Wang, Tu-Cheng (TW);
Xiao-Na Liu, Shenzhen (TW); An-Tze Lee, Tu-Cheng (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 579 days.

(21) Appl. No.: 13/090,233

(22) Filed: Apr. 19, 2011

(65) Prior Publication Data

US 2012/0169839 A1    Jul. 5, 2012

(30) Foreign Application Priority Data

Dec. 29, 2010    (CN) .......................... 2010 1 0612265

(51) Int. Cl.
*H04N 7/00*         (2011.01)
(52) U.S. Cl.
USPC .......................................................... 348/36

(58) Field of Classification Search
USPC .......................................................... 348/36
See application file for complete search history.

(56) References Cited

U.S. PATENT DOCUMENTS 5,771,119 A * 6/1998 Kang ............................ 359/432
2011/0194017 A1* 8/2011 Yoshitsugu ................... 348/345

FOREIGN PATENT DOCUMENTS

| CN | 101315457 A | 12/2008 |
| CN | 101859019 A | 10/2010 |
| CN | 101900870 A | 12/2010 |

* cited by examiner

*Primary Examiner* — Dave Czekaj
*Assistant Examiner* — Tracy Li
(74) *Attorney, Agent, or Firm* — Novak Druce Connolly Bove + Quigg LLP

(57) ABSTRACT

A wide-angle zoom lens includes a first lens group with positive refraction power, a second lens group with negative refraction power, a third lens group with positive refraction power, and a fourth lens group with positive refraction power. The first lens group, the second lens group, the third lens group, and the fourth lens group move along an optical axis of the zoom lens in focusing. The wide-angle zoom lens satisfies the formulas: 1.6<f3/fw<2.1, where f3 is the effective focal length of the third lens group, and fw is the effective focal length of the wide-angle zoom lens in a wide angle state.

16 Claims, 14 Drawing Sheets

WIDE-ANGLE ZOOM LENS AND CAMERA MODULE USING SAME

BACKGROUND

1. Technical Field

The present disclosure relates to wide-angle zoom lenses and, particularly, to a wide-angle zoom lens with a large zoom ratio and a camera module using same.

2. Description of Related Art

Wide-angle zoom lenses with a large zoom ratio are widely used. However, there are certain challenges in designing such lenses. For example, if the zoom ratio of a wide-angle zoom lens is increased, the aberration of the wide-angle zoom lens in a wide-angle state will be increased as well. If the field of view of a wide-angle zoom lens is increased, the aberration of the wide-angle zoom lens in a telephoto state will be increased as well. Therefore, it is hard to design a wide-angle zoom lenses with a low degree of aberration.

Therefore, it is desirable to provide a wide-angle zoom lens and a camera module which can overcome the limitations described above.

DETAILED DESCRIPTION

Embodiments of the disclosure will now be described in detail with reference to the accompanying drawings.

Figure 1:
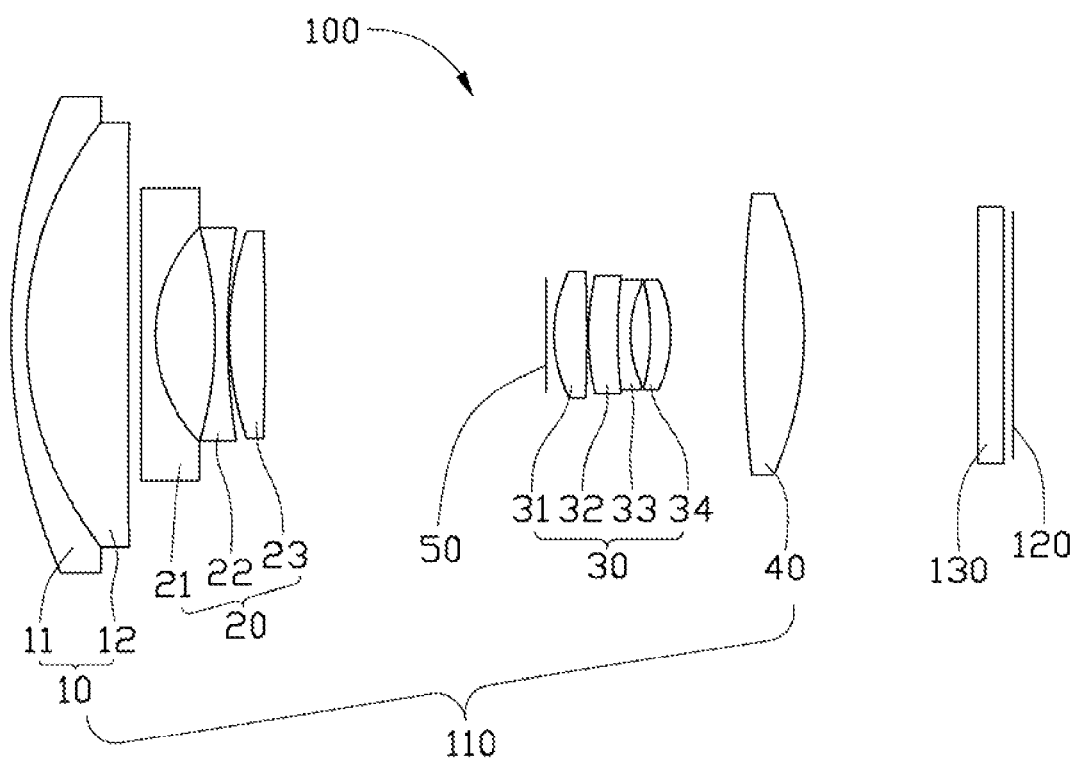
FIG. 1 is a schematic view of a wide-angle zoom lens of a camera module in accordance with a first exemplary embodiment.

Referring to FIG. 1, a camera module 100, according to a first exemplary embodiment, includes a wide-angle zoom lens 110, an image sensor 120, and a filter 130 positioned between the wide-angle zoom lens 110 and the image sensor 120 and covering the image sensor 120.

The wide-angle zoom lens 110 is configured for optically capturing an image of an object at an object side and forms a corresponding image at an image side. The wide-angle zoom lens 110 includes, in the order from the object side to the image side, a first lens group 10 with positive refraction power, a second lens group 20 with negative refraction power, a third lens group 30 with positive refraction power, and a fourth lens group 40 with positive refraction power. The wide-angle zoom lens 110 further includes an aperture 50 positioned between the second lens group 20 and the third lens group 30 During focusing, the first lens group 10, the second lens group 20, the third lens group 30, and the fourth lens group 40 move along an optical axis of the wide-angle zoom lens 100. The wide-angle zoom lens 110 can be set among a wide-angle state, a middle state, and a telephoto state.

The first lens group 10 includes, in the order from the object side to the image side of the wide-angle zoom lens 110, a first lens 11 with negative refraction power and a second lens 12 with negative refraction power. The first lens 11 and the second lens 12 are spherical lenses, and are adhered to a compound lens. The first lens 11 is meniscus shaped and includes a convex first surface facing the object side, and a concave second surface facing the image side. The second lens 12 is meniscus shaped and includes a convex third surface facing the object side, and a concave fourth surface facing the image side.

The second lens group 20 includes, in the order from the object side to the image side of the wide-angle zoom lens 110, a third lens 21 with negative refraction power, a fourth lens 22 with negative refraction power, and a fifth lens 23 with positive refraction power. The third lens 21, the fourth lens 22, and the fifth lens 23 are spherical lenses. The third lens 21 is meniscus shaped and includes a convex fifth surface facing the object side, and a concave sixth surface facing the image side. The fourth lens 22 is biconcave shaped and includes a concave seventh surface facing the object side, and a concave eighth surface facing the image side. The fifth lens 23 is biconvex shaped and includes a convex ninth surface facing the object side, and a convex tenth surface facing the image side.

The third lens group 30 includes, in the order from the object side to the image side of the wide-angle zoom lens 110, a sixth lens 31 with positive refraction power, a seventh lens 32 with positive refraction power, a eighth lens 33 with negative refraction power, and a ninth lens 34 with positive refraction power. The sixth lens 31 is aspheric lens, and the seventh lens 32, the eighth lens 33, and the ninth lens 34 are spherical lenses. The seventh lens 32 and the eighth lens 33 are adhered to a compound lens. The sixth lens 31 is biconvex shaped and includes a convex eleventh surface facing the object side, and a convex twelfth surface facing the image side. The seventh lens 32 is meniscus shaped and includes a convex thirteenth surface facing the object side, and a concave fourteenth surface facing the image side. The eighth lens 33 is meniscus shaped and includes a convex fifteenth surface facing the object side, and a concave sixteenth surface facing the image side. The ninth lens 34 is meniscus shaped and includes a concave seventeenth surface facing the object side, and a convex eighteenth surface facing the image side.

The fourth lens group 40 includes a tenth lens 41 with positive refraction power. The tenth lens 41 is spherical lens. The tenth lens 41 is biconvex shaped and includes a convex nineteenth surface facing the object side, and a convex twentieth surface facing the image side.

The filter 130 is flat plate shaped, and includes a twenty-first surface facing the object side and a twenty-second surface facing the image side.

The wide-angle zoom lens 110 satisfies the formulas:

$$1.6 < f3/fw < 2.1; \qquad (1)$$

wherein f3 is the effective focal length of the third lens group 30, and fw is the effective focal length of the wide-angle zoom lens 110 in a wide angle state. Formula (1) is for decreasing the refraction angle of lights in the middle state, limiting the coma generated by the off-axis lights, improving resolution of circumference, and decreasing the astigmatism and axial chromatic aberration in the wide angle state.

The wide-angle zoom lens 110 further satisfies the formula:

$$1.55 < V2/V1 < 1.95; \quad (2)$$

wherein V1 is the Abbe number of the first lens 11 and V2 is the Abbe number of the second lens 12. Formula (2) is for correcting the axial chromatic aberration when the wide-angle zoom lens 110 is in the wide-angle state and for correcting the lateral chromatic aberration when the wide-angle zoom lens 110 is in the telephoto state.

The wide-angle zoom lens 110 further satisfies the formulas:

$$1.00 < V7/V8 < 2.2; \quad (3)$$

Wherein V7 is the Abbe number of the seventh lens 32 and V8 is the Abbe number of the eighth lens 33. Formula (3) is for balancing lateral chromatic aberration in both the wide angle state and the telephoto state.

In the first embodiment, the wide-angle zoom lens 110 satisfies the parameters of Tables 1-3, wherein f3=8.8 mm, fw=4.589 mm, f3/fw=1.918, V1=29.1, V2=47.5, V2/V1=1.632, V7=25.5, V8=21.2, and V2/V1=1.203. Listed below are the symbols used in Tables 1-3:

R: radius of curvature,

D: distance between surfaces on the optical axis,

Nd: refractive index for the Helium d-line (587.56 nm) of lens,

Vd: Abbe number, f: effective focal length of the wide-angle zoom lens,

D3: distance between the fourth surface and the fifth surface on the optical axis, D9: distance between the tenth surface and the eleventh surface on the optical axis, D17: distance between the eighteenth surface and the nineteenth surface on the optical axis, and D19: distance between the twentieth surface and the twenty-first surface on the optical axis.

TABLE 1

| surface | type | R(mm) | D(mm) | Nd | Vd |
|---|---|---|---|---|---|
| first surface | spherical | 18.68 | 0.5 | 2 | 29.1 |
| second/third surface | spherical | 10.713 | 3.2 | 1.79 | 47.5 |
| fourth surface | spherical | 977.31 | D3 | | |
| fifth surface | spherical | 536.17 | 0.46 | 1.91 | 35.3 |
| sixth surface | spherical | 4.772 | 1.885 | | |
| seventh surface | spherical | −11.95 | 0.39 | 1.76 | 40.1 |
| eighth surface | spherical | 21.1 | 0.05 | | |
| ninth surface | spherical | 9.981 | 1.14 | 1.95 | 18 |
| tenth surface | spherical | −102.53 | D9 | | |
| aperture | | infinity | 0.25 | | |
| eleventh surface | aspherical | 4.293 | 1.05 | 1.66 | 49.2 |
| twelfth surface | aspherical | −42.22 | 0.05 | | |
| thirteenth surface | spherical | 8.349 | 0.915 | 1.81 | 25.5 |
| fourteenth/fifteenth surface | spherical | 15.45 | 0.4 | 1.92 | 21.2 |
| sixteenth surface | spherical | 3.715 | 0.628 | | |
| seventeenth surface | spherical | −6.678 | 0.65 | 1.52 | 64.2 |
| eighteenth surface | spherical | −4.203 | D17 | | |
| nineteenth surface | spherical | 37.65 | 1.89 | 1.44 | 95.1 |
| twentieth surface | spherical | −10.829 | D19 | | |
| twenty-first surface | flat | infinity | 0.8 | 1.52 | 64.2 |
| twenty-second surface | flat | infinity | 0.3 | | |

TABLE 2

| state | F | D3 | D9 | D17 | D19 |
|---|---|---|---|---|---|
| wide-angle state | 4.589 | 0.4 | 8.857 | 2.304 | 5.497 |
| middle state | 14.864 | 7.404 | 3.238 | 12.833 | 4.258 |
| telephoto state | 35.03 | 14.546 | 1.253 | 17.684 | 0.979 |

TABLE 3

| aspherical coefficient | eleventh surface | twelfth surface |
|---|---|---|
| K | 0.074832 | 4.038006 |
| A4 | −9.780427e−04 | 1.231141e−03 |
| A6 | −2.796593e−04 | 2.324849e−04 |
| A8 | 1.617595e−04 | −3.826881e−04 |
| A10 | −5.692094e−05 | 2.578707e−04 |
| A12 | 3.455023e−06 | −9.99632e−05 |
| A14 | 1.392467e−06 | 1.931572e−05 |
| A16 | −2.118921e−07 | −1.484695e−06 |

The aspherical surfaces are shaped according to the formula:

$$x = \frac{ch^2}{1 + \sqrt{1 - (k+1)c^2 h^2}} + \sum A_i h^i$$

wherein h is a height from the optical axis of the sixth lens 31 to the aspherical surface, c is a vertex curvature, k is a conic constant, and Ai are i-th order correction coefficients of the aspherical surfaces.

In the first embodiment, the wide-angle zoom lens 110 satisfies the parameters of Table 4, listed below are the symbols used in Table 4: $2\omega$: field angle; $F_{No}$: F number.

TABLE 4

| state | $2\omega$ | $F_{No}$ |
|---|---|---|
| wide-angle state | 80.6 | 3.07 |
| middle state | 29.52 | 5.01 |
| telephoto state | 12.72 | 6.11 |

Figure 2:
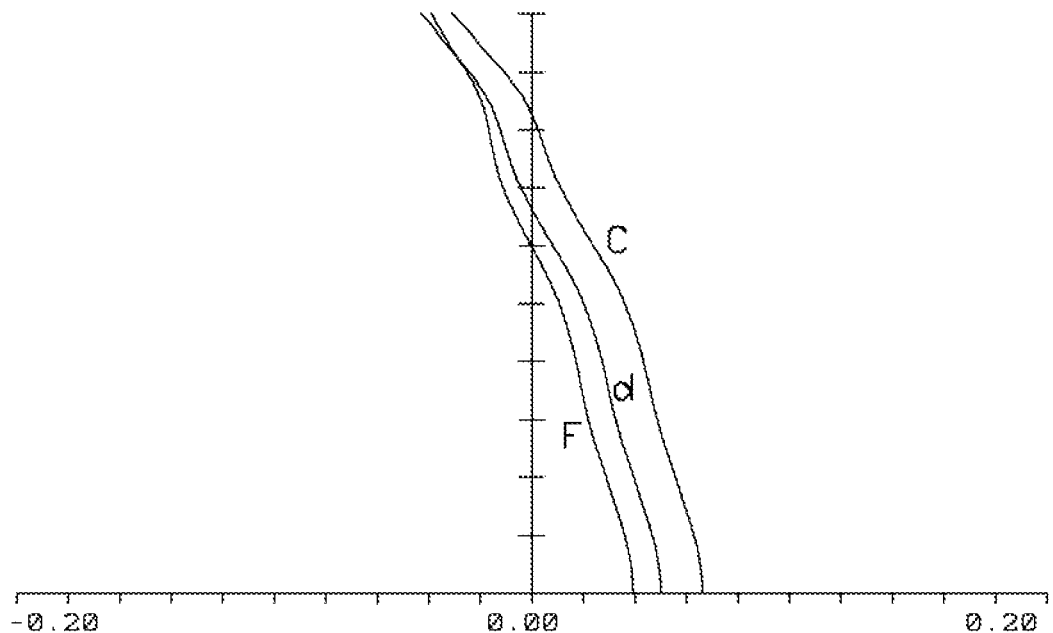
FIGS. 2-4 are graphs respectively showing field curvature, distortion and spherical aberration of the wide-angle zoom lens of FIG. 1, when the wide-angle zoom lens is in a wide-angle state.
Figure 3:
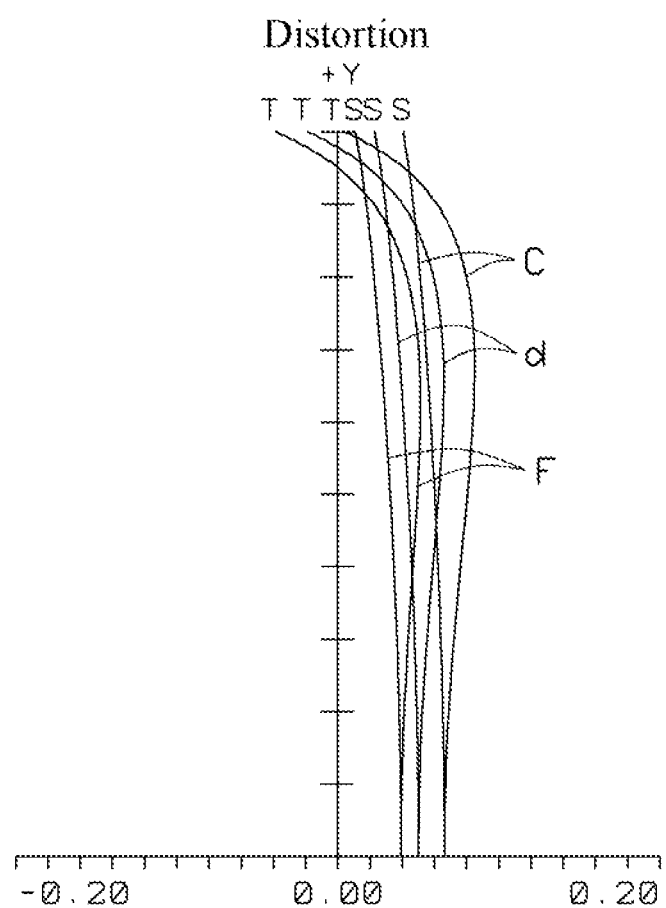
Figure 4:
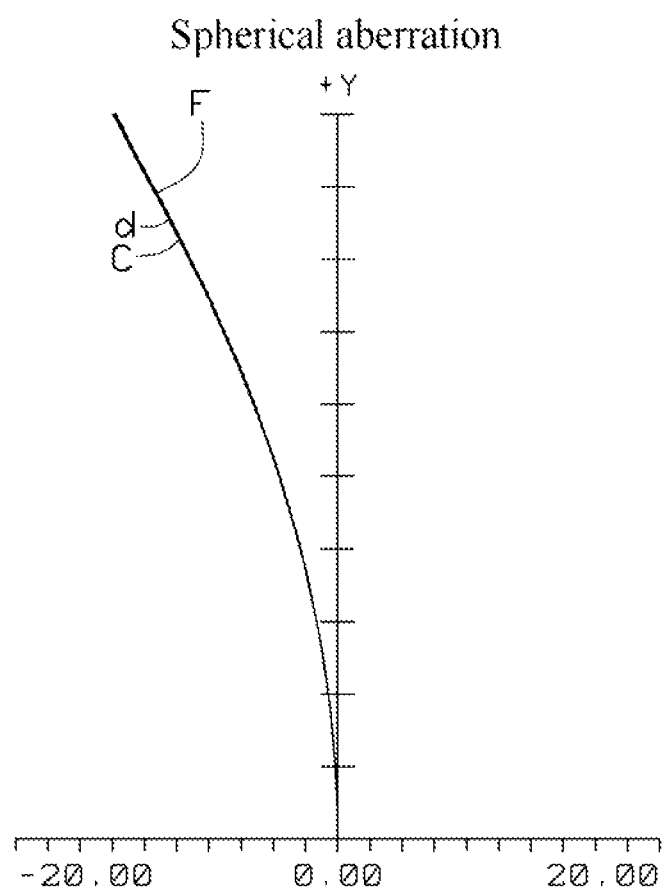

The spherical aberration graph, the field curvature graph, and the distortion graph of the wide-angle zoom lens 110 in the wide angle state are respectively shown in FIGS. 2-4. Generally, spherical aberration of visible light (with a wavelength between 400~700 nm) in FIG. 2 is within a range of −0.20 mm to 0.20 mm. The sagittal field curvature and tangential field curvature shown in FIG. 3 are kept within a range of −0.20 mm to 0.20 mm. The distortion in FIG. 4 falls within a range of −20% to 0%. Obviously, the spherical aberration, field curvature, and distortion are well controlled in the wide-angle zoom lens 110.

Figure 5:
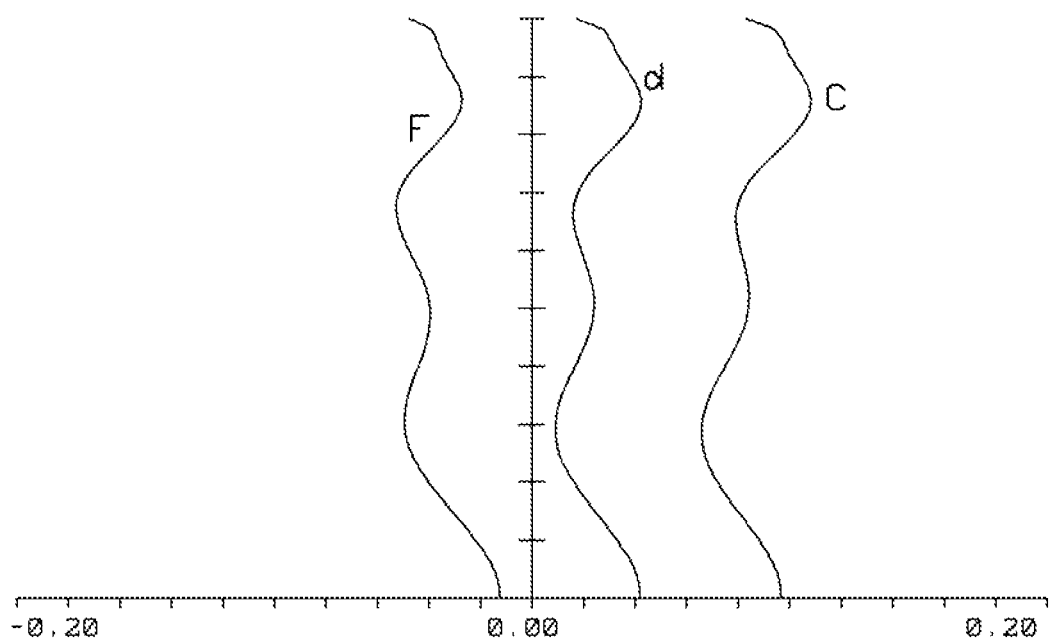
FIGS. 5-7 are graphs respectively showing field curvature, distortion and spherical aberration of the wide-angle zoom lens of FIG. 1, when the wide-angle zoom lens is in a telephoto state.
Figure 6:
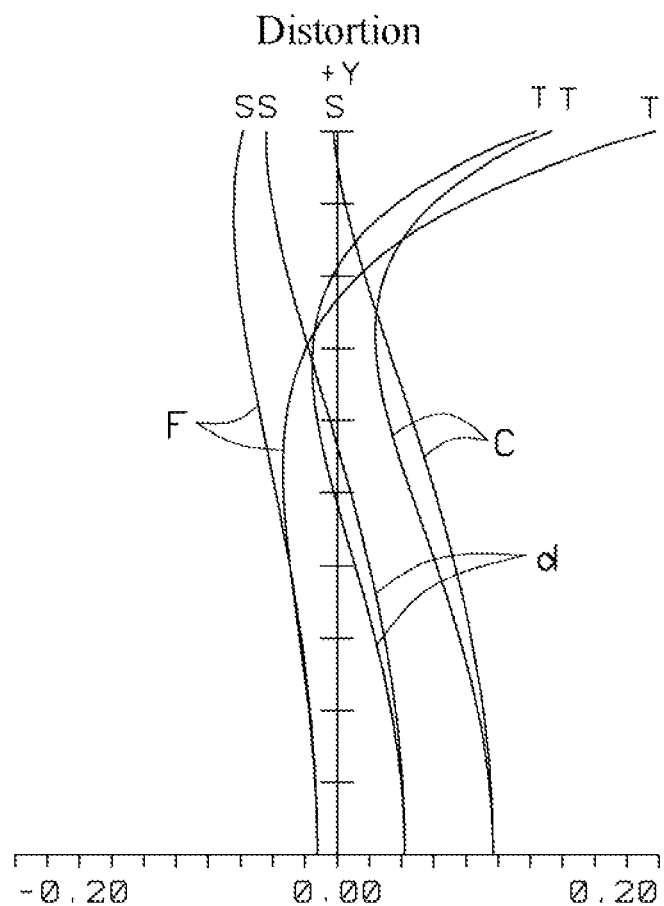
Figure 7:
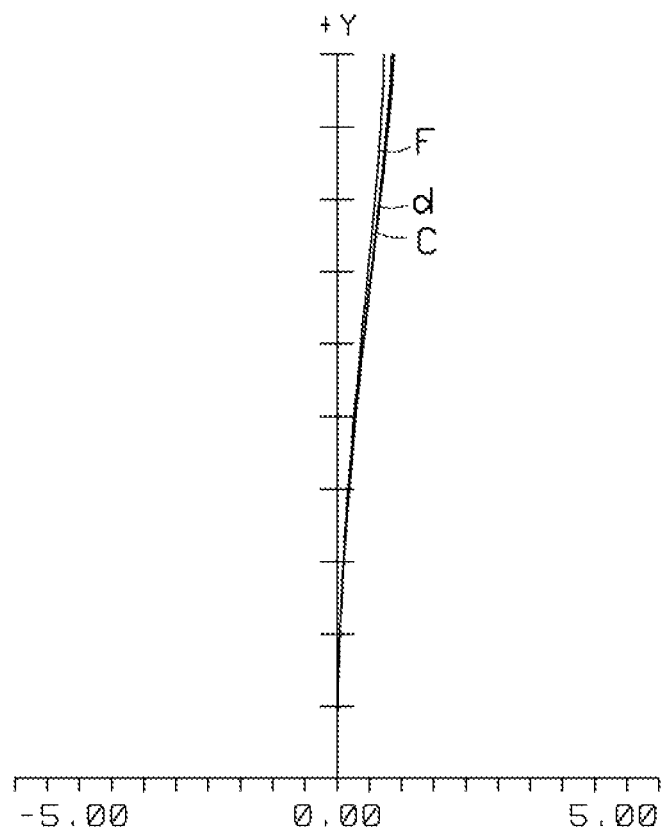

The spherical aberration graph, the field curvature graph, and the distortion graph of the wide-angle zoom lens 110 in the telephoto state are respectively shown in FIGS. 5-7. Generally, spherical aberration of visible light (with a wavelength between 400~700 nm) in FIG. 5 is within a range of −0.20 mm to 0.20 mm. The sagittal field curvature and tangential field curvature shown in FIG. 6 are kept within a range of −0.20 mm to 0.20 mm. The distortion in FIG. 7 falls within a range of 0% to 5%. Obviously, the spherical aberration, field curvature, and distortion are well controlled in the wide-angle zoom lens 110.

Figure 8:
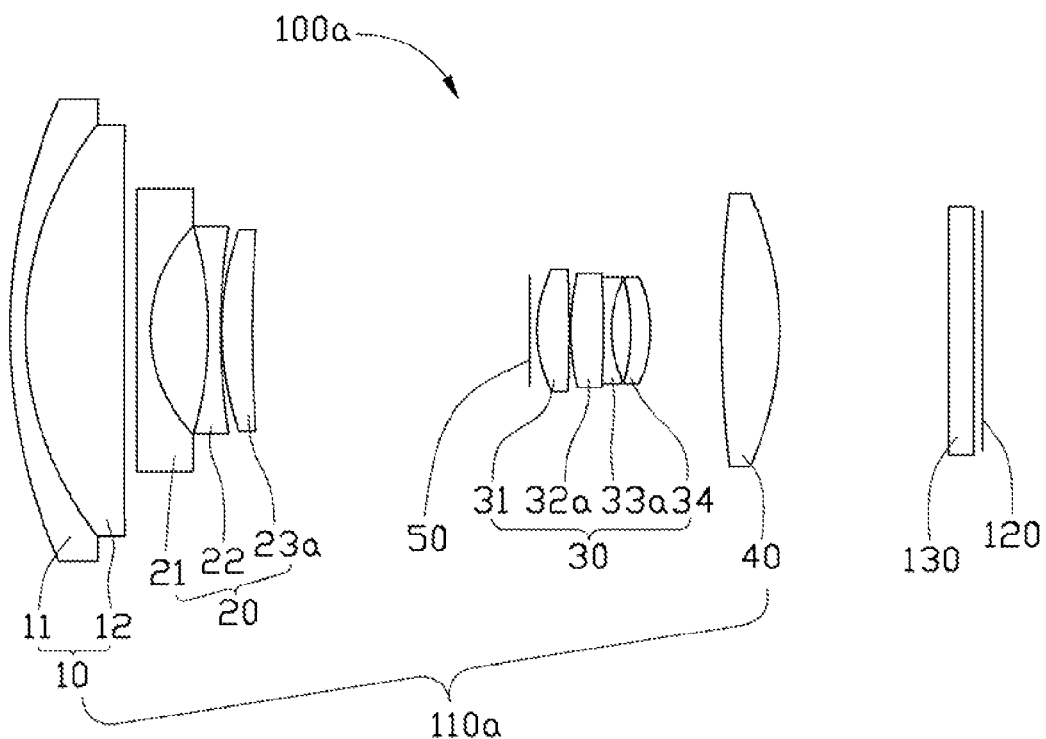
FIG. 8 is a schematic view of a wide-angle zoom lens of a camera module in accordance with a second exemplary embodiment.

Referring to FIG. 8, a wide-angle zoom lens 110a according to a second ex exemplary embodiment is shown. The difference between the wide-angle zoom lens 110a and the wide-angle zoom lens 110 of the first exemplary embodiment is: the fifth lens 23a is meniscus shaped and includes a convex ninth surface facing the object side, and a concave tenth surface facing the image side; the seventh lens 32a is biconvex shaped and includes a convex thirteenth surface facing the object side, and a convex fourteenth surface facing the image side; the eighth lens 33a is biconcave shaped and includes a concave fifteenth surface facing the object side, and a concave sixteenth surface facing the image side.

In the second exemplary embodiment, the wide-angle zoom lens 110a satisfies the parameters of Tables 5-7, wherein f3=7.99 mm, fw=4.59 mm, f3/fw=1.741, V1=25.5, V2=47.5, V2/V1=1.863, V7=42.7, V8=21.2, and V2/V1=2.014. Listed below are the symbols used in Tables 5-7:

R: radius of curvature,

D: distance between surfaces on the optical axis,

Nd: refractive index for the Helium d-line (587.56 nm) of lens,

Vd: Abbe number, f: effective focal length of the wide-angle zoom lens,

D3: distance between the fourth surface and the fifth surface on the optical axis, D9: distance between the tenth surface and the eleventh surface on the optical axis, D17: distance between the eighteenth surface and the nineteenth surface on the optical axis, and D19: distance between the twentieth surface and the twenty-first surface on the optical axis.

TABLE 5

| surface | type | R(mm) | D(mm) | Nd | Vd |
|---|---|---|---|---|---|
| first surface | spherical | 16.84 | 0.5 | 2 | 25.5 |
| second/third surface | spherical | 10.67 | 3.2 | 1.79 | 47.5 |
| fourth surface | spherical | 98.71 | D3 | | |
| fifth surface | spherical | 66.53 | 0.46 | 1.91 | 35.3 |
| sixth surface | spherical | 4.38 | 1.962 | | |
| seventh surface | spherical | −15.45 | 0.39 | 1.77 | 49.6 |
| eighth surface | spherical | 18.27 | 0.05 | | |
| ninth surface | spherical | 8.66 | 1.14 | 1.95 | 18 |
| tenth surface | spherical | 55.27 | D9 | | |
| aperture | | infinity | 0.25 | | |
| eleventh surface | aspherical | 4.128 | 1.05 | 1.69 | 31.2 |
| twelfth surface | aspherical | −27.43 | 0.05 | | |
| thirteenth surface | spherical | 6.483 | 0.915 | 1.83 | 42.7 |
| fourteenth/fifteenth surface | spherical | −40.29 | 0.4 | 1.92 | 21.2 |
| sixteenth surface | spherical | 3.14 | 0.628 | | |
| seventeenth surface | spherical | −10.806 | 0.65 | 1.52 | 52.2 |
| eighteenth surface | spherical | −6.171 | D17 | | |
| nineteenth surface | spherical | 24.46 | 1.89 | 1.44 | 95.1 |
| twentieth surface | spherical | −11.756 | D19 | | |
| twenty-first surface | flat | infinity | 0.8 | 1.52 | 64.2 |
| twenty-second surface | flat | infinity | 0.3 | | |

TABLE 6

| state | F | D3 | D9 | D17 | D19 |
|---|---|---|---|---|---|
| wide-angle state | 4.59 | 0.4 | 8.262 | 2.545 | 4.52 |
| middle state | 14.777 | 9.247 | 4.537 | 12.311 | 1 |
| telephoto state | 34.932 | 14.69 | 1.294 | 16.578 | 1.8 |

TABLE 7

| aspherical coefficient | eleventh surface | twelfth surface |
|---|---|---|
| K | −0.064257 | 21.624852 |
| A4 | −1.1687e-03 | 6.232816e-04 |
| A6 | −2.63373e-04 | 3.592567e-04 |
| A8 | 1.364952e-04 | −4.56334e-04 |
| A10 | −4.272166e-05 | 2.854698e-04 |
| A12 | 3.662511e-06 | −1.00664e-04 |
| A14 | 4.211646e-07 | 1.801178e-05 |
| A16 | −7.754252e-08 | −1.290504e-06 |

The aspherical surfaces are shaped according to the formula:

$$x = \frac{ch^2}{1 + \sqrt{1 - (k+1)c^2 h^2}} + \sum A_i h^i$$

wherein h is a height from the optical axis of the sixth lens 31 to the aspherical surface, c is a vertex curvature, k is a conic constant, and Ai are i-th order correction coefficients of the aspherical surfaces.

In the second exemplary embodiment, the wide-angle zoom lens 110a satisfies the parameters of Table 8, listed below are the symbols used in Table 8: 2ω: field angle; $F_{No}$: F number.

TABLE 8

| state | 2ω | $F_{No}$ |
|---|---|---|
| wide-angle state | 80.6 | 3.07 |
| middle state | 29.52 | 4.97 |
| telephoto state | 12.72 | 6.1 |

Figure 9:
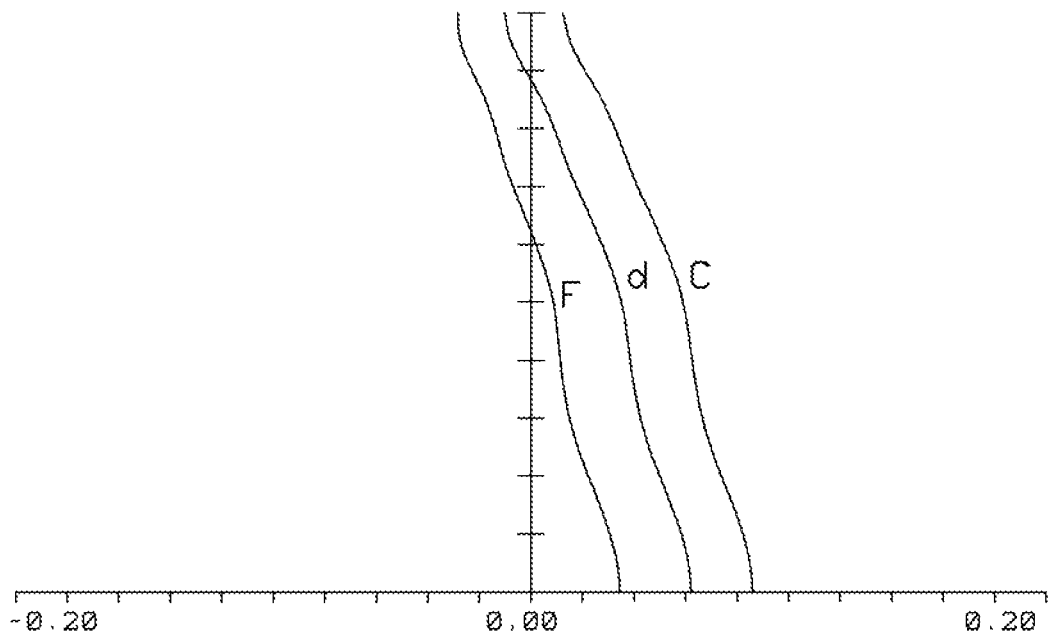
FIGS. 9-11 are graphs respectively showing field curvature, distortion and spherical aberration of the wide-angle zoom lens of FIG. 8, when the wide-angle zoom lens is in a wide-angle state.
Figure 10:
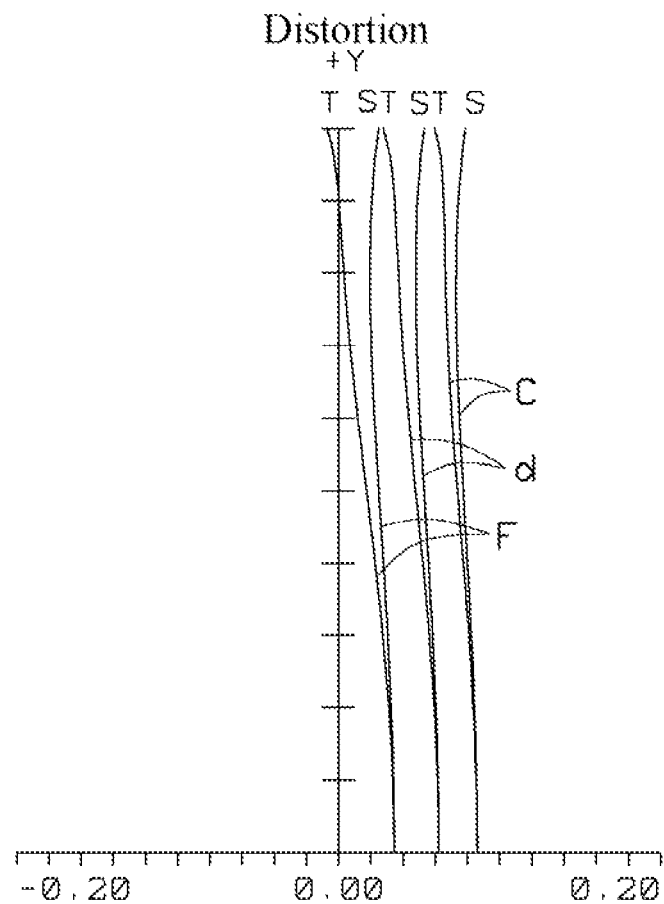
Figure 11:
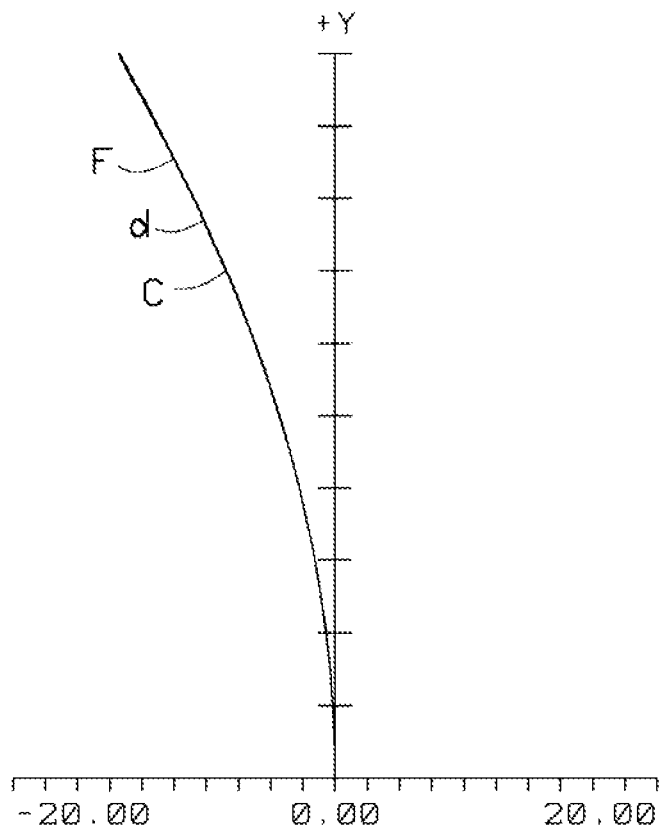

The spherical aberration graph, the field curvature graph, and the distortion graph of the wide-angle zoom lens 110a in the wide angle state are respectively shown in FIGS. 9-11. Generally, spherical aberration of visible light (with a wavelength between 400~700 nm) in FIG. 9 is within a range of −0.20 mm to 0.20 mm. The sagittal field curvature and tangential field curvature shown in FIG. 10 are kept within a range of −0.20 mm to 0.20 mm. The distortion in FIG. 11 falls within a range of −20% to 0%. Obviously, the spherical aberration, field curvature, and distortion are well controlled in the wide-angle zoom lens 110a.

Figure 12:
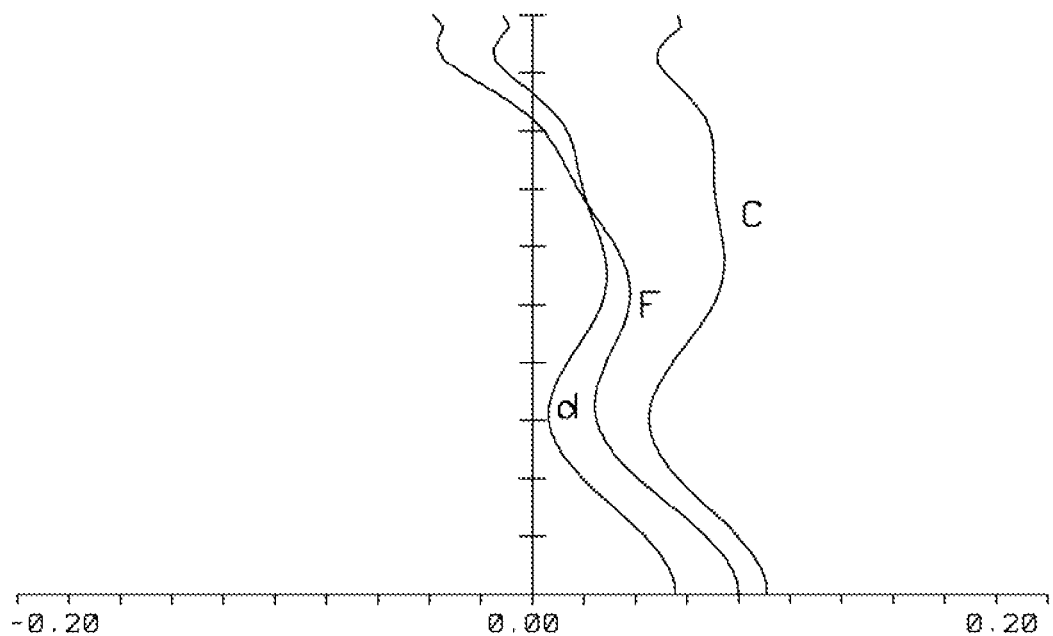
FIGS. 12-14 are graphs respectively showing field curvature, distortion and spherical aberration of the wide-angle zoom lens of FIG. 8, when the wide-angle zoom lens is in a telephoto state.
Figure 13:
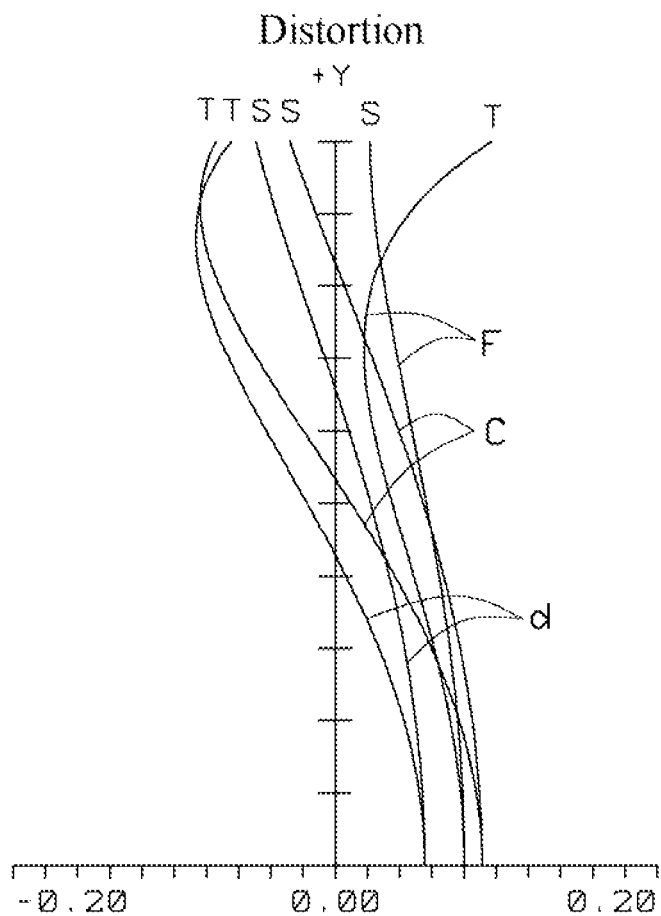
Figure 14:
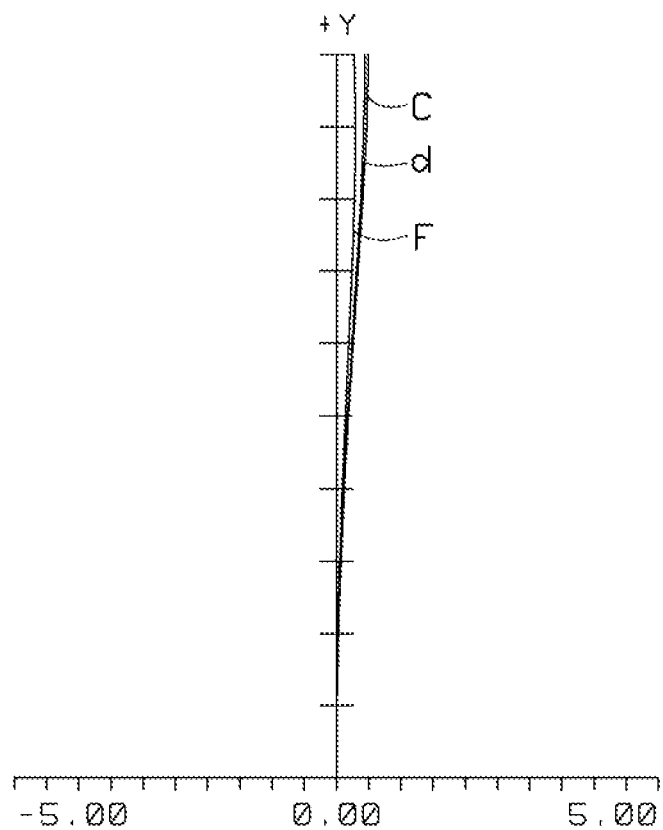

The spherical aberration graph, the field curvature graph, and the distortion graph of the wide-angle zoom lens 110a in the telephoto state are respectively shown in FIGS. 12-14. Generally, spherical aberration of visible light (with a wavelength between 400~700 nm) in FIG. 12 is within a range of −0.20 mm to 0.20 mm. The sagittal field curvature and tangential field curvature shown in FIG. 13 are kept within a range of −0.20 mm to 0.20 mm. The distortion in FIG. 14 falls within a range of 0% to 5%. Obviously, the spherical aberration, field curvature, and distortion are well controlled in the wide-angle zoom lens 110a.

Wherein the wave length of F, d, and C lights of FIGS. 2-7 and FIGS. 9-14 are 486 nm, 587 nm, and 656 nm respectively.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A wide-angle zoom lens for imaging an object on an imaging surface, in the order from the object side to the image side, the wide-angle zoom lens comprising: a first lens group with positive refraction power; a second lens group with negative refraction power; a third lens group with positive refraction power; and a fourth lens group with positive refraction power, the first lens group, the second lens group, the third lens group, and the fourth lens group being capable of moving along an optical axis of the wide-angle zoom lens; wherein the wide-angle zoom lens satisfies the formulas: 6<f3/fw<2.1; where f3 is the effective focal length of the third lens group, and fw is the effective focal length of the wide-angle zoom lens in a wide angle state; the first lens group comprises, in the order from the object side to the image side of the wide-angle zoom lens, a first lens with negative refraction power and a second lens with negative refraction power; the wide-angle zoom lens further satisfies the formulas: 55<V2/V1<1.95; where V1 is the Abbe number of the first lens, and V2 is the Abbe number of the second lens.

2. The wide-angle zoom lens as claimed in claim 1, wherein the first lens and the second lens are spherical lenses, and are adhered to a compound lens.

3. The wide-angle zoom lens as claimed in claim 1, wherein the second lens group comprises, in the order from the object side to the image side of the wide-angle zoom lens, a third lens with negative refraction power, a fourth lens with negative refraction power, and a fifth lens with positive refraction power.

4. The wide-angle zoom lens as claimed in claim 3, wherein the third lens, the fourth lens, and the fifth lens are spherical lenses.

5. The wide-angle zoom lens as claimed in claim 1, wherein the third lens group comprises, in the order from the object side to the image side of the wide-angle zoom lens, a sixth lens with positive refraction power, a seventh lens with positive refraction power, a eighth lens with negative refraction power, and a ninth lens with positive refraction power.

6. The wide-angle zoom lens as claimed in claim 5, wherein the wide-angle zoom lens further satisfies the formulas: 00<V7/V8<2.2; where V7 is the Abbe number of the seventh lens and V8 is the Abbe number of the eighth lens.

7. The wide-angle zoom lens as claimed in claim 5, wherein the sixth lens is aspheric lens, and the seventh lens, the eighth lens, and the ninth lens are all spherical lenses; the seventh lens and the eighth lens are adhered to a compound lens.

8. The wide-angle zoom lens as claimed in claim 1, wherein the third lens group comprises a tenth lens with positive refraction power, the tenth lens is spherical lens.

9. A camera module comprising: a wide-angle zoom lens; an image sensor; and a filter positioned between the wide-angle zoom lens and the image sensor and covering on the image sensor; wherein the wide-angle zoom lens, in the order from the object side to the image side, comprises: a first lens group with positive refraction power, a second lens group with negative refraction power, a third lens group with positive refraction power, and a fourth lens group with positive refraction power; the first lens group, the second lens group, the third lens group, and the fourth lens group are capable of moving along an optical axis of the wide-angle zoom lens in focusing; wherein the wide-angle zoom lens satisfies the formulas: 6<f3/fw<2.1; where f3 is the effective focal length of the third lens group, and fw is the effective focal length of the wide-angle zoom lens in a wide angle state; the first lens group comprises, in the order from the object side to the image side of the wide-angle zoom lens, a first lens with negative refraction power and a second lens with negative refraction power; the wide-angle zoom lens further satisfies the formulas: 55<V2/V1<1.95; where V1 is the Abbe number of the first lens and V2 is the Abbe number of the second lens.

10. The camera module as claimed in claim 9, wherein the first lens and the second lens are spherical lenses, and are adhered to a compound lens.

11. The camera module as claimed in claim 9, wherein the second lens group comprises, in the order from the object side to the image side of the wide-angle zoom lens, a third lens with negative refraction power, a fourth lens with negative refraction power, and a fifth lens with positive refraction power.

12. The camera module as claimed in claim 11, wherein the third lens, the fourth lens, and the fifth lens are spherical lenses.

13. The camera module as claimed in claim 9, wherein the third lens group comprises, in the order from the object side to the image side of the wide-angle zoom lens, a sixth lens with positive refraction power, a seventh lens with positive refraction power, a eighth lens with negative refraction power, and a ninth lens with positive refraction power.

14. The camera module as claimed in claim 13, wherein the wide-angle zoom lens further satisfies the formulas: 1.00<V7/V8<2.2; where V7 is the Abbe number of the seventh lens and V8 is the Abbe number of the eighth lens.

15. The camera module as claimed in claim 13, wherein the sixth lens is aspheric lens, and the seventh lens, the eighth lens, and the ninth lens are spherical lenses; the seventh lens and the eighth lens are adhered to a compound lens.

16. The camera module as claimed in claim 9, wherein the third lens group comprises a tenth lens with positive refraction power, the tenth lens is spherical lens.

* * * * *